United States Patent
Hu

(10) Patent No.: US 9,726,851 B2
(45) Date of Patent: Aug. 8, 2017

(54) VOICE COIL MOTOR AND FOCUSING LENS

(71) Applicant: BOLYMEDIA HOLDINGS CO. LTD., Santa Clara, CA (US)

(72) Inventor: Xiaoping Hu, Shenzhen (CN)

(73) Assignee: BOLYMEDIA HOLDINGS CO. LTD., Santa Clara, CA (US)

( * ) Notice: Subject to any disclaimer, the term of this patent is extended or adjusted under 35 U.S.C. 154(b) by 0 days.

(21) Appl. No.: 15/302,479

(22) PCT Filed: Apr. 15, 2014

(86) PCT No.: PCT/CN2014/075377
§ 371 (c)(1),
(2) Date: Oct. 6, 2016

(87) PCT Pub. No.: WO2015/157909
PCT Pub. Date: Oct. 22, 2015

(65) Prior Publication Data
US 2017/0031129 A1    Feb. 2, 2017

(51) Int. Cl.
G02B 7/04      (2006.01)
H02K 33/18    (2006.01)
H02K 41/035  (2006.01)

(52) U.S. Cl.
CPC .............. *G02B 7/04* (2013.01); *H02K 33/18* (2013.01); *H02K 41/0356* (2013.01)

(58) Field of Classification Search
CPC ... G02B 7/04; G02B 7/09; G02B 7/10; G02B 7/105; H02K 41/0356; H02K 33/18
See application file for complete search history.

(56) References Cited

U.S. PATENT DOCUMENTS

2007/0166022 A1*  7/2007  Lai ........................... G02B 7/08
                                                                              396/133
2008/0231975 A1    9/2008  Hou et al.
(Continued)

FOREIGN PATENT DOCUMENTS

CN       1992483 A       7/2007
CN     201063067 Y       5/2008
(Continued)

OTHER PUBLICATIONS

Written Opinion of the International Searching Authority for PCT/CN2014/075377 mailed on Jan. 23, 2015 (English translation provided by WIPO).
(Continued)

*Primary Examiner* — Joseph P Martinez
(74) *Attorney, Agent, or Firm* — Ladas & Parry, LLP

(57) ABSTRACT

A voice coil motor and a corresponding focusing lens. A rotor assembly (22) is connected to a stator assembly (21) by means of an elastic connecting piece (23). A stator sleeve (211) is sleeved on a rotor sleeve (221). One of the stator sleeve (211) and the rotor sleeve (221) is a permanent magnetic material sleeve, and the other is a non-magnetic material sleeve. An assembly to which the non-magnetic material sleeve belongs also comprises a pre-magnetic element (222) and a drive coil (223). The premagnetic element (222) is made of a permanent magnetic or magnetized material, and is fixed relative to the non-magnetic material sleeve. The elastic connecting piece (23) is in a force balance state in a case without power because of pre-existing magnetic force between the pre-magnetic element (222) and the permanent magnetic material sleeve. Smaller electromagnetic force is required for driving the elastic connecting piece (23) to move, thereby reducing a drive current and power consumption.

11 Claims, 3 Drawing Sheets

(56) References Cited

U.S. PATENT DOCUMENTS

2008/0310037 A1     12/2008   Kuo et al.
2011/0235195 A1      9/2011   Ke

FOREIGN PATENT DOCUMENTS

| CN | 101738702 A | 6/2010 |
|----|-------------|--------|
| CN | 102043225 A | 5/2011 |
| CN | 104753303   | 7/2015 |
| TW | 325524 U    | 1/2008 |

OTHER PUBLICATIONS

International Preliminary Report on Patentability Ch I for PCT/CN2014/075377 mailed on Oct. 18, 2016 (English translation provided by WIPO).

International Search Report for PCT/CN2014/075377 dated on Jan. 23, 2015 and its English translation provided by WIPO.

* cited by examiner

VOICE COIL MOTOR AND FOCUSING LENS

CROSS-REFERENCE TO RELATED APPLICATION

This application is the U.S. National Stage of International Patent Application No. PCT/CN2014/075377 filed on Apr. 15, 2014, the disclosure of which is hereby incorporated by reference in its entirety.

TECHNICAL FIELD

The present disclosure relates to electromechanical field, specifically to a linear voice coil motor and its application in focusing lens.

BACKGROUND

A voice coil motor (VCM) is a relatively simple motor. Specifically, a linear voice coil motor is widely used in the optical field, such as an auto focus module of a camera of a cell phone. For clarity, a moving part in the voice coil motor is referred to as a rotor assembly, and a relatively fixed part is referred to as a stator assembly hereinafter.

A basic structure of the voice coil motor shown in FIG. 1 generally includes a stator 11, a rotor 12 and an elastic connecting piece 13. The elastic connecting piece connects the rotor and the stator. A load (not shown) is fixedly mounted at the rotor. In FIG. 1, the stator is a permanent magnet, and the rotor assembly includes a drive coil 123 wound on the rotor. After the drive coil is supplied with power, the rotor is linearly moved under the action of the magnetic field of the stator. A movement of the rotor in an opposite direction may be achieved by supplying a reverse current to the drive coil or utilizing the restoring force of the elastic connecting piece. In other examples, it is also possible that the rotor is a permanent magnet and the drive coil is a part of the stator assembly.

The voice coil motor with the aforesaid structure may precisely position the location of the load, for example moving a focus lens to a desired position, by means of balance between the electromagnetic force generated by the drive coil and the elastic force of the elastic connecting piece. In general, the elastic force of the elastic connecting piece is proportional to the displacement thereof in a working range, which leads to that the larger the displacement of the rotor, the larger the electromagnetic force required, and the larger the current of the drive coil. When the rotor needs to be stayed at a fixed position, for example a position for focusing, for a long time, the current of the drive coil needs to be maintained for a long time, which leads to a larger static holding power consumption of the voice coil motor.

SUMMARY OF THE INVENTION

According to the present disclosure, a voice coil motor is provided. The voice coil motor may include a stator assembly, a rotor assembly and an elastic connecting piece. The rotor assembly is connected to the stator assembly by means of the elastic connecting piece. The stator assembly includes a stator sleeve. The rotor assembly includes a rotor sleeve sleeved with the stator sleeve. One of the stator sleeve and the rotor sleeve is a permanent magnetic material sleeve, and the other is a non-magnetic material sleeve. An assembly to which the non-magnetic material sleeve belongs may also include a pre-magnetic element and a drive coil. The pre-magnetic element is made of a permanent magnetic or magnetized material and fixed with respect to the non-magnetic material sleeve. The drive coil is arranged at an inner surface or an outer surface of the non-magnetic material sleeve. Pre-existing magnetic force between the pre-magnetic element and the permanent magnetic material sleeve reaches equilibrium with elastic force of the elastic connecting piece in a case without powering the drive coil.

With the voice coil motor of the present disclosure, by means of the pre-existing magnetic force, the elastic connecting piece is in a force balance state in a case without power, and smaller electromagnetic force is required for driving the elastic connecting piece to move, thereby reducing a drive current and power consumption.

The specific embodiments of the present disclosure will be described in details in following with reference to the drawings.

DETAILED DESCRIPTION

Figure 1:
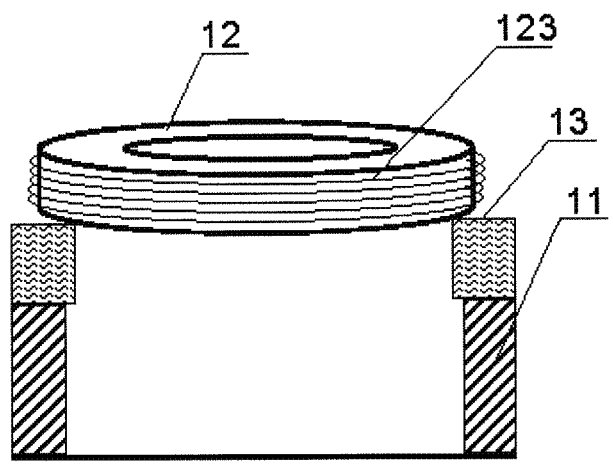
FIG. 1 is a schematic diagram of a structure of a conventional voice coil motor.
Figure 2:
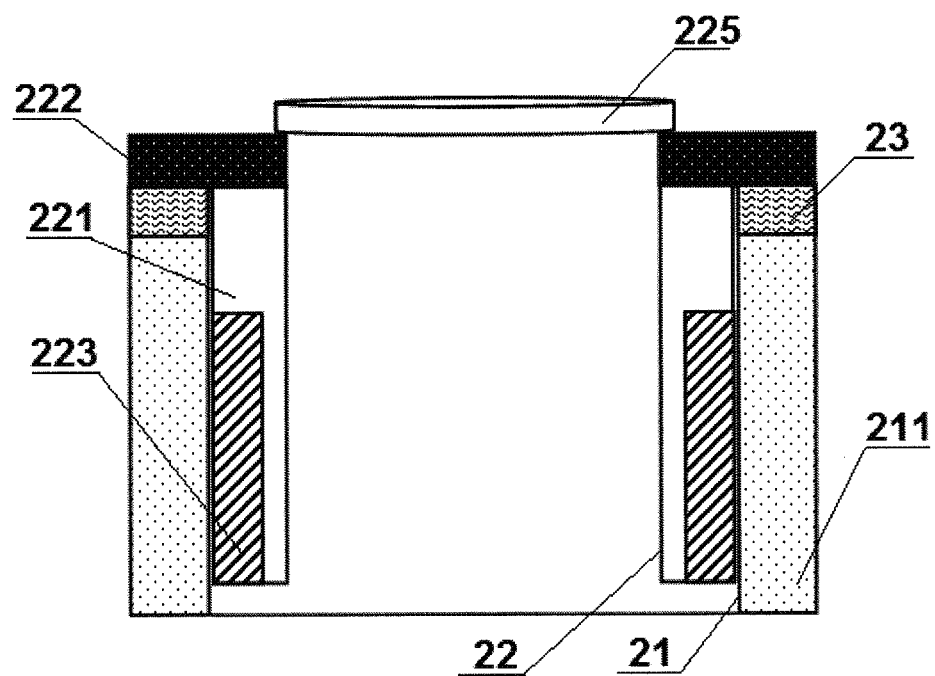
FIG. 2 is a schematic diagram of an equivalent structure of a voice coil motor according to the present disclosure.

Referring to FIG. 2, an equivalent structure of a voice coil motor according to the present disclosure may include a stator assembly 21, a rotor assembly 22 and an elastic connecting piece 23. The rotor assembly may connect with the stator assembly by means of the elastic connecting piece.

The stator assembly which is relatively fixed may include stator sleeve 211. The stator sleeve may be fixed on a component (not shown) such as a substrate or a base, or fixed on other fixing members located on a position where the voice coil motor mounted.

The rotor assembly may include a rotor sleeve 221 sleeved with the stator sleeve. In some applications, for example optical zoom and focus, the rotor sleeve is preferably sleeved with the stator sleeve coaxially. Moreover, to better maintain stability of optic axis during axial movement, the stator sleeve is preferably sleeved compactly with the rotor sleeve, and a contact surface therebetween is smooth. In a specific implementation, the stator sleeve may be sleeved at the outside of the rotor sleeve or at the inside of the rotor sleeve, which may be determined according to design needs.

The elastic connecting piece may, in general, be a helical spring, or in other forms such as a plane spring leaf manufactured by a metal etching process.

According to the present disclosure, one of the stator sleeve and the rotor sleeve is a permanent magnetic material sleeve and the other is a non-magnetic material sleeve. An assembly to which the non-magnetic material sleeve belongs may also include a pre-magnetic element and a drive coil. For example, as shown in FIG. 2, the stator sleeve is a permanent magnetic material sleeve and the rotor sleeve is a non-magnetic material sleeve. Accordingly the rotor assembly may include a pre-magnetic element 222 and a drive coil 223. Of course, in another case, the stator sleeve may be a non-magnetic material sleeve while the rotor sleeve may be a permanent magnetic material sleeve, the stator assembly then may also include the pre-magnetic element and the drive coil.

The pre-magnetic element may be made of a permanent magnetic or magnetized material and fixed with respect to the non-magnetic material sleeve. For example, if the rotor sleeve is a non-magnetic material sleeve, the pre-magnetic element may be a magnet ring arranged coaxially and fixed at an end of the rotor sleeve, as shown in FIG. 2; for another example, if the stator sleeve is a non-magnetic material sleeve, the pre-magnetic element may be fixed on the stator sleeve or other components within the stator assembly such as a substrate or a base. In some embodiments, the pre-magnetic element may be arranged in distribute form, such as inset in an interlaced type or fixed on the non-magnetic material sleeve, as long as capable of generating pre-existing magnetic force with the permanent magnetic material sleeve.

The drive coil may be provided at an inner surface or an outer surface of the non-magnetic material sleeve. For example, as shown in FIG. 2, the drive coil is arranged at the outer wall of the rotor sleeve, and clings to the inner wall of the stator sleeve. The drive coil may be wound with insulation coating lines, such as enameled wire. Or the drive coil may be made of a single layer or multiple layers of flexible printed circuit board (FPC), which may avoid difficulty produced by winding (especially size of the voice coil motor acted as optical focus is generally not big) and facilitate installation because of replacing winding with printed circuit.

Further, when using a focusing lens for optical zoom and focus, it is usually to fasten a lens group which needs to be moved on the rotor assembly. For example, as shown in FIG. 2, the lens group 225 is fixed on the magnet ring. In other embodiments, the lens group may also be mounted on a lens support member which is then connected to the rotor assembly.

In a case without powering the drive coil, a pre-existing magnetic force (which may be an attractive or repulsive magnetic force) between the pre-magnetic element and the permanent magnetic material sleeve may give rise to deformation of the elastic connecting piece connecting the rotor assembly and the stator assembly, and reach equilibrium with elastic force generated from the elastic connecting piece, so that the elastic connecting piece may be in a force balance state in advance. Therefore, a position where the elastic connecting piece keeps balance in advance may be set to be one of or between the two endpoints of the working range of the elastic connecting piece to keep zero power consumption in corresponding working state. Moreover, the power consumption required by the elastic connecting piece deviated from the force balance position may also be smaller than a case without applying the "pre-existing magnetic force", which may achieve advantages of low power consumption and long travel when used in optical focus. Reference can be made to a Chinese invention patent application CN201310748592.0 for detailed theoretical analyses about reduction in driving power consumption of the elastic connecting piece by the pre-existing magnetic force.

In a case when powering the drive coil, an acting force may be generated between the coil and the permanent magnetic material sleeve as well as the pre-magnetic element, which further changes balance between "pre-existing magnetic force" and the elastic force, thereby driving the rotor assembly to move axially. The acting force between the permanent magnetic material sleeve and the drive coil will be illustrated conceptually as below.

There may be two kinds of magnetization direction for the permanent magnetic material sleeve: one is radial magnetization, i.e. the inner and outer surfaces of the sleeve are one of the south and north magnetic poles respectively; and the other is axial magnetization, i.e. the upper and lower ends of the sleeve are one of the south and north magnetic poles respectively.

In a case where the magnetization direction of the permanent magnetic material sleeve is radial magnetization, an axial electromagnetic force (Lorentz force) may be generated between the coil and the permanent magnetic material sleeve when powering the drive coil, thus propelling the rotor assembly to move up and down.

In a case where the magnetization direction of the permanent magnetic material sleeve is axial magnetization, the magnetic field force between the coil and the permanent magnetic material sleeve may be along the radial direction and cancelled each other out due to circumferential symmetry. However, the magnetic field generated by the coil may be identical to or different from the permanent magnetic material sleeve in magnetic field direction, so the magnetic field generated by current may be added to or canceled with the magnetic field generated by the permanent magnetic material sleeve; thereby increasing or decreasing the acting force between the permanent magnetic material sleeve and the pre-magnetic element, and achieving movement of the rotor assembly by means of breaking balance between the "pre-existing magnetic force" and the elastic force.

Preferably, the elastic connecting piece can be made of magnetized material such as steel or ferromagnetic material, which may achieve delivering magnetic force between permanent magnetic material sleeve and the pre-magnetic element, helping to reduce weight of the rotor assembly.

As mentioned above, the voice coil motor according to the present disclosure may have various specific structures. For example, the relative locations of the stator sleeve and the rotor sleeve can be exchanged. For another example, the magnetization direction of the permanent magnetic material sleeve can be radial or axial direction. For still another example, the pre-magnetic element can be arranged at the stator assembly or at the rotor assembly. Such variance can be combined to obtain various specific implementations. Several specific embodiments of the voice coil motor according to the present disclosure will be exemplarily described in following.

First Embodiment

Figure 3:
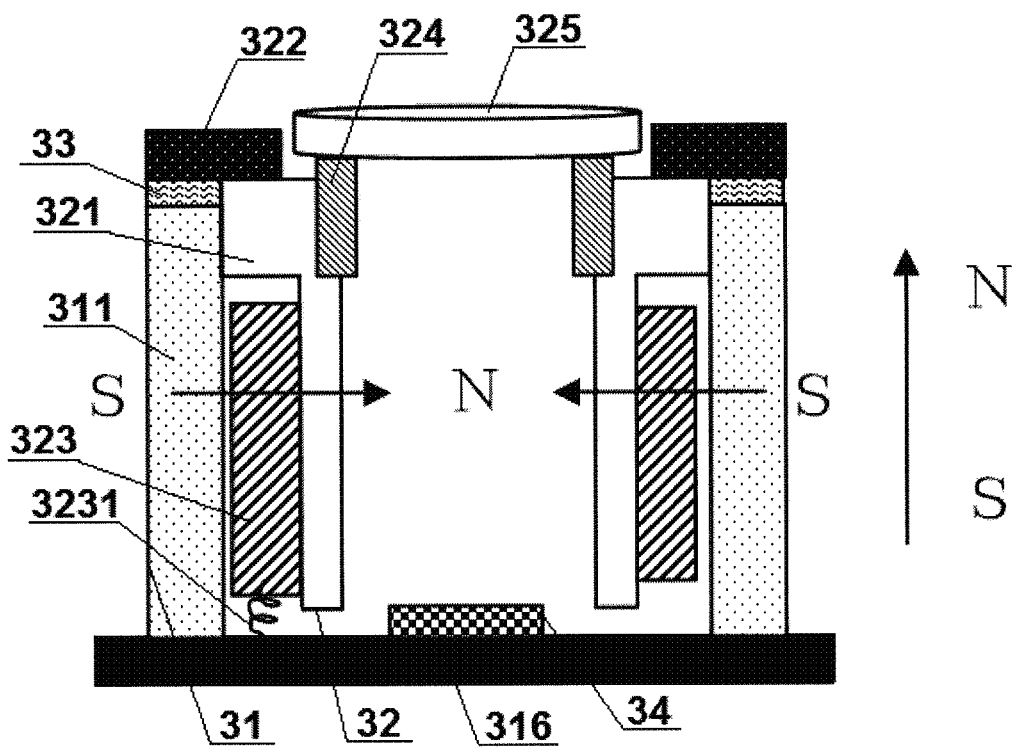
FIG. 3 is a schematic diagram of a voice coil motor in a first embodiment.

Referring to FIG. 3, an embodiment of the voice coil motor according to the present disclosure may include a stator assembly 31, a rotor assembly 32 and an elastic connecting piece 33. The stator assembly may include a stator sleeve 311 and a base plate 316. The stator sleeve may be a permanent magnetic material sleeve. The rotor assembly may include a rotor sleeve 321, a pre-magnetic ring 322 and a drive coil 323. The rotor sleeve may be a non-magnetic material sleeve.

In this embodiment, the base plate may preferably be a printed circuit board (PCB) for a more compact structure and simplification of electrical connection. The stator sleeve may be fixed on the base plate.

The rotor sleeve may be compactly sleeved inside the stator sleeve coaxially. The drive coil may be arranged at the outside of rotor sleeve and cling to the inner wall of the stator sleeve. The pre-magnetic ring may be fixed at an end of the rotor sleeve away from the base plate. The elastic connecting piece may be connected between the pre-magnetic ring and the end of the rotor sleeve away from the base plate.

Since a circuit can be placed on the PCB base plate, the drive coil can directly connect to the base plate through a lead pin 3231 in a rigid or plastic manner so as to access to a driving circuit in this embodiment.

The voice coil motor in this embodiment can be used in a lens capable of focus, such as an auto focus lens module. Accordingly, a sensitive chip 34 can be also installed on the PCB base plate, and the rotor assembly can further include a lens support member 324 for supporting a lens group 325. The lens support member may be fixed relative to the rotor sleeve. Preferably, the lens support member may be threadedly engaged with the rotor sleeve for facilitating adjustment of focus length at the force balance position of the elastic connecting piece during installation without powering the drive coil.

In FIG. 3, N and S may represent optionally directions of magnetic pole of the stator sleeve respectively. As shown in the figure, the magnetization direction of the stator sleeve can be the radial direction (where the inner and outer surfaces of the stator sleeve are the south magnetic pole or the north magnetic pole respectively), or the axial direction (where the upper and lower ends of the stator sleeve are the south magnetic pole or the north magnetic pole respectively). Based on the structure in this embodiment, the magnetization direction of the stator sleeve can preferably be the radial direction.

Second Embodiment

Figure 4:
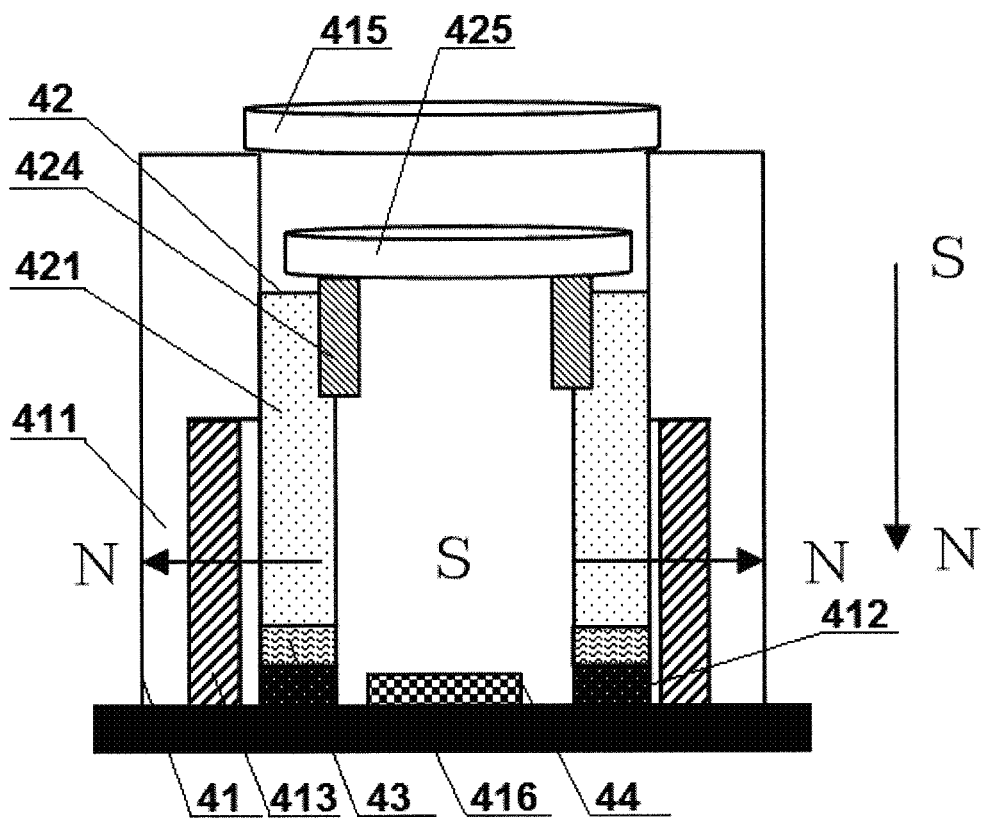
FIG. 4 is a schematic diagram of a voice coil motor in a second embodiment.

Referring to FIG. 4, another embodiment of the voice coil motor according to the present disclosure may include a stator assembly 41, a rotor assembly 42 and an elastic connecting piece 43. The stator assembly may include a stator sleeve 411, a PCB base plate 416, a pre-magnetic ring 412 and a drive coil 413. The stator sleeve may be a non-magnetic material sleeve. The rotor assembly may include a rotor sleeve 421 and a lens support member 424. The rotor sleeve may be a permanent magnetic material sleeve. Compared with the first embodiment, a main difference in this embodiment is that the rotor sleeve is a permanent magnetic material sleeve.

In this embodiment, the stator sleeve and the pre-magnetic ring may be fixed on the PCB base plate. The drive coil may be arranged at the inside of the stator sleeve and cling to the outer wall of the rotor sleeve. The rotor sleeve may be compactly sleeved inside the stator sleeve coaxially. The elastic connecting piece may be connected between the pre-magnetic ring and an end of the rotor sleeve close to the PCB base plate. Due to being arranged at the stator assembly, the drive coil can be directly inserted on the PCB base plate so as to connect with the circuit. The lens support member can be threadedly engaged with the drive coil for adjusting focus length during installation.

The voice coil motor in this embodiment can be used for focusing a lens. Accordingly, a sensitive chip 44 can be also installed on the PCB base plate, a focusing lens group 425 can be mounted at the lens support member, and a fixed-focus lens group 415 may be further provided and fixed on the stator sleeve.

In FIG. 3, N and S may represent optionally directions of magnetic pole of the rotor sleeve respectively. As shown in the figure, the magnetization direction of the rotor sleeve can be the radial direction, or the axial direction. Based on the structure in this embodiment, the magnetization direction of the rotor sleeve can preferably be the radial direction.

Third Embodiment

Figure 5:
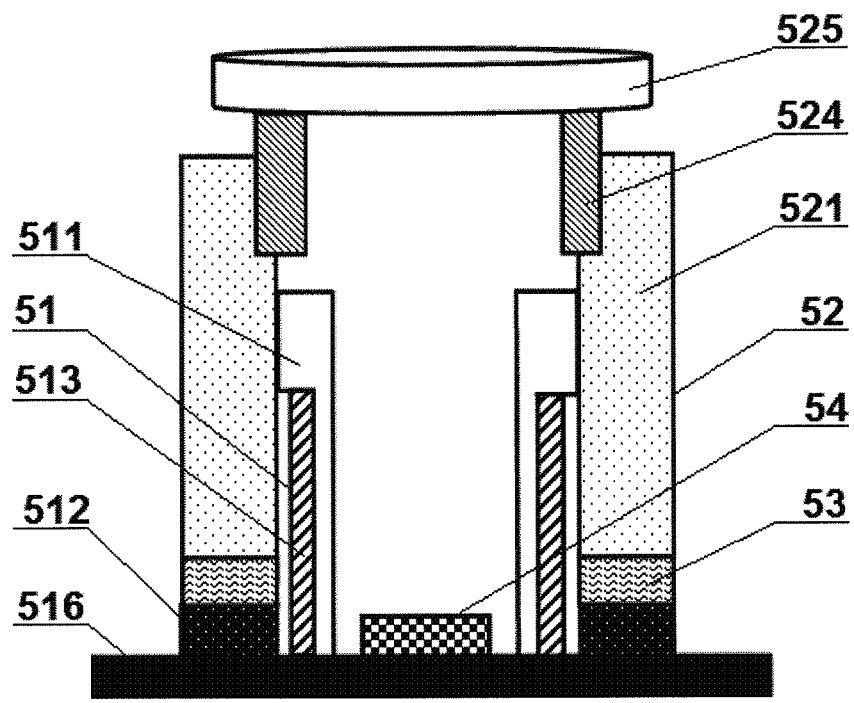
FIG. 5 is a schematic diagram of a voice coil motor in a third embodiment.

Referring to FIG. 5, another embodiment of the voice coil motor according to the present disclosure may include a stator assembly 51, a rotor assembly 52 and an elastic connecting piece 53. The stator assembly may include a stator sleeve 511, a PCB base plate 516, a pre-magnetic ring 512 and a drive coil 513. The stator sleeve may be a non-magnetic material sleeve. The rotor assembly may include a rotor sleeve 521 and a lens support member 524. The rotor sleeve may be a permanent magnetic material sleeve. Compared with the second embodiment, a main difference in this embodiment is that the positions of the stator sleeve and rotor sleeve are exchanged.

In this embodiment, the stator sleeve and the pre-magnetic ring may be fixed on the PCB base plate. The drive coil may be arranged at the outside of the stator sleeve and cling to the inner wall of the rotor sleeve. The rotor sleeve may be compactly sleeved outside the stator sleeve coaxially. The elastic connecting piece may be connected between the pre-magnetic ring and an end of the rotor sleeve close to the PCB base plate. The drive coil can be directly inserted on the PCB base plate so as to connect with the circuit. The lens support member can be threadedly engaged with rotor sleeve for adjusting focus length during installation.

Figure 6:
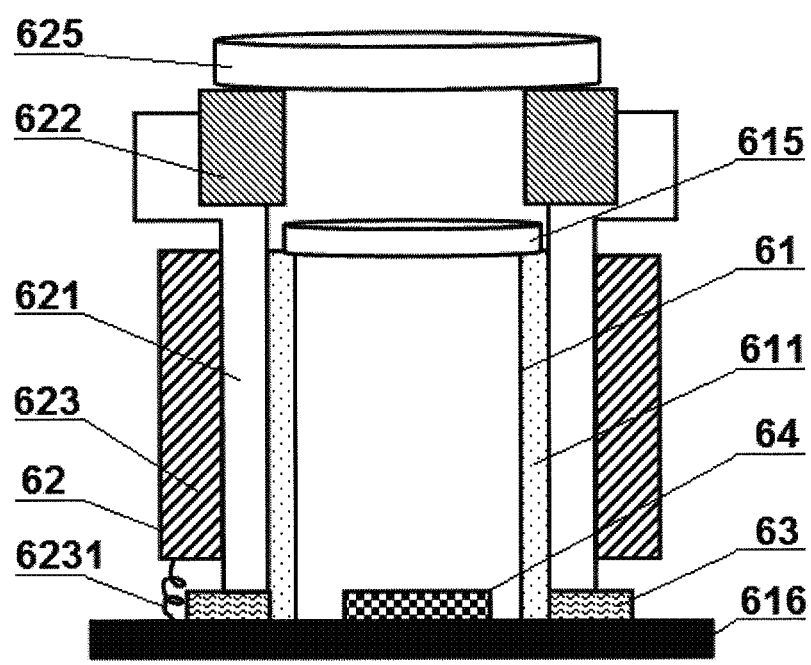
FIG. 6 is a schematic diagram of a voice coil motor in a fourth embodiment.

The voice coil motor in this embodiment can be used for focusing a lens. Accordingly, a sensitive chip 54 can be also installed on the PCB base plate, and a focusing lens group 525 can be mounted at the lens support member Fourth Embodiment Referring to FIG. 6, another embodiment of the voice coil motor according to the present disclosure may include a stator assembly 61, a rotor assembly 62 and an elastic connecting piece 63. The stator assembly may include a stator sleeve 611 and a PCB base plate 616. The stator sleeve may be a permanent magnetic material sleeve. The rotor assembly may include a rotor sleeve 621, a pre-magnetic ring 622 and a drive coil 623. The rotor sleeve may be a non-magnetic material sleeve. Compared with the first embodiment, main difference in this embodiment may include exchange of positions of the stator sleeve and the rotor sleeve, different mounting position of the elastic connecting piece, and different way to mount the pre-magnetic ring.

In the embodiment, the stator sleeve may be fixed on the PCB base plate. The rotor sleeve may be compactly sleeved outside the stator sleeve. The drive coil may be arranged at the outside of the rotor sleeve and directly connected with the base plate through a lead pin 6231 in a rigid or plastic manner so as to insert in the driving circuit. The elastic connecting piece may be connected between the base plate and an end of the rotor sleeve close to the base plate.

In the embodiment, the pre-magnetic ring may be a hollow magnet ring, and acted as a lens support member i.e. supporting a focusing lens group 625. The pre-magnetic ring may be threadedly engaged with the rotor sleeve for adjusting focus length during installation. Such preferable structure can not only save a component, but also simplify processing and installation.

The voice coil motor in the embodiment can used for focusing a lens; accordingly, a sensitive chip 64 can also be mounted on the PCB base plate, and a fixed-focus lens group 615 can further be provided and fixed on the stator sleeve.

In the above-mentioned embodiment of the voice coil motor according to the present disclosure, auto focus or zoom for lens can be achieved by only employed six or seven components (not including the PCB base plate, the sensitive chip and the optional fixed-focus lens group), which not only simplifies assembling, but also obtains long travel and low power consumption for focus. The voice coil motor, taking advantage of balance between the "pre-existing magnetic force" and the elastic force, can be referred to be a super voice coil motor.

Furthermore, by means of providing one or two groups of zoom lens system sleeved outside the above-mentioned voice coil motor, a function of zooming lens can be achieved. By means of providing one or two groups of zoom lens system sleeved outside some embodiments having fixed-focus lens system (such as the second or fourth embodiment), a zooming lens having four lens groups can be implemented. Therefore, according to the present disclosure, the voice coil motor can not only used for realizing auto focus lens module, but also for acting as a focus part in a zoom lens.

The principles and embodiments of the present disclosure have been described above with reference to specific examples. However, it should be understood that the aforesaid embodiments are merely used to facilitate the understanding to the present disclosure, and should not be interpreted as limitations thereto. A variety of modifications to the specific embodiments described above can be made by a person ordinarily skilled in the art according the concepts of the present disclosure.

What is claimed is:

1. A voice coil motor, comprising: a stator assembly, a rotor assembly and an elastic connecting piece, the rotor assembly being connected to the stator assembly by means of the elastic connecting piece,
    the stator assembly comprising a stator sleeve,
    the rotor assembly comprising a rotor sleeve sleeved with the stator sleeve,
    wherein:
    one of the stator sleeve and the rotor sleeve is a permanent magnetic material sleeve, and the other thereof is a non-magnetic material sleeve;
    an assembly to which the non-magnetic material sleeve belongs also comprises:
    a pre-magnetic element made of a permanent magnetic or magnetized material and fixed with respect to the non-magnetic material sleeve, and
    a drive coil arranged at an inner surface or an outer surface of the non-magnetic material sleeve,
    a pre-existing magnetic force between the pre-magnetic element and the permanent magnetic material sleeve reaches equilibrium with an elastic force of the elastic connecting piece in a case without powering the drive coil.

2. The voice coil motor according to claim 1, wherein magnetization direction of the permanent magnetic material sleeve is radial direction or axial direction.

3. The voice coil motor according to claim 1, wherein the stator sleeve is sleeved compactly on the rotor sleeve with a smooth surface as a contacting surface therebetween.

4. The voice coil motor according to claim 1, wherein the elastic connecting piece is made of magnetized material.

5. The voice coil motor according to claim 1, wherein the drive coil is wound with insulation coating lines, or made of a single layer or multiple layers of flexible printed circuit board (FPC).

6. The voice coil motor according to claim 1, wherein the stator assembly further comprises a base plate, the stator sleeve is fixed on the base plate.

7. The voice coil motor according to claim 6, wherein the pre-magnetic element is fixed on an end of the non-magnetic material sleeve away from the base plate, and the elastic connecting piece is connected between the pre-magnetic element and an end of the permanent magnetic material sleeve away from the base plate; or, the pre-magnetic element is fixed on the base plate, and the elastic connecting piece is connected between the pre-magnetic element and an end of the permanent magnetic material sleeve close to the base plate.

8. The voice coil motor according to claim 6, wherein the base plate is a printed circuit board (PCB), and the drive coil is directly connected to the base plate by means of a lead pin in a rigid or plastic manner.

9. The voice coil motor according to claim 1, wherein the rotor assembly further comprises:
    a lens support member for supporting a lens group, the lens support member being threadedly engaged with the rotor sleeve for refocusing during installation.

10. The voice coil motor according to claim 1, wherein the rotor sleeve is a non-magnetic material sleeve, the pre-magnetic element is a hollow magnet ring for supporting a lens group, and the pre-magnetic element is threadedly engaged with the rotor sleeve for refocusing during installation.

11. A focusing lens, comprising a voice coil motor, a sensitive chip and a focusing lens group, wherein the voice coil motor has a structure of the voice coil motor according to claim 6, the sensitive chip is fixed on the base plate, and the focusing lens group is mounted at the rotor assembly.

* * * * *